United States Patent [19]
Vermesse

[11] Patent Number: 4,780,601
[45] Date of Patent: Oct. 25, 1988

[54] CONTROL SYSTEM FOR FRANKING MACHINES

[75] Inventor: Bernard Vermesse, L'Hay les Roses, France

[73] Assignee: SMH Alcatel, Paris Cedex, France

[21] Appl. No.: 880,972

[22] Filed: Jul. 1, 1986

[30] Foreign Application Priority Data

Jul. 2, 1985 [FR] France .................................. 85 10082

[51] Int. Cl.⁴ .............................................. G06F 15/20
[52] U.S. Cl. ..................................................... 235/375
[58] Field of Search ......................................... 235/375

[56] References Cited

U.S. PATENT DOCUMENTS

| | | |
|---|---|---|
| 3,255,439 | 6/1966 | Simjian .................................. 235/375 |
| 4,007,355 | 2/1977 | Moreno . | 
| 4,218,011 | 8/1980 | Simjian .................................. 235/375 |
| 4,222,518 | 9/1980 | Simjian .................................. 235/375 |
| 4,226,360 | 10/1980 | Simjian .................................. 235/375 |
| 4,352,011 | 9/1982 | Guillou . |
| 4,450,535 | 5/1984 | de Pommery . |

FOREIGN PATENT DOCUMENTS

| | | |
|---|---|---|
| 8106396 | 3/1981 | European Pat. Off. . |
| 0049650 | 9/1981 | European Pat. Off. . |
| 2032224 | 7/1979 | United Kingdom . |
| 2066736 | 12/1980 | United Kingdom . |
| 2077189 | 5/1981 | United Kingdom . |

*Primary Examiner*—Harold I. Pitts
*Attorney, Agent, or Firm*—Sughrue, Mion, Zinn, Macpeak and Seas

[57] ABSTRACT

A control system for a set of franking machines (1) under the surveillance of a control center (2) for managing them and containing, to this end, as does each of the machines, a logic circuit organized about a processor (24) and memories (26). The data to be transmitted from the control center to the machines and vice-versa are interchanged by means of "smart" cards (3) having incorporated memory (7) and microprocessors (6) which are placed alternately in read/write terminals (5 or 4) of the control center or of the machines.

9 Claims, 3 Drawing Sheets

FIG. 3

| | | | | | | | | | |
|---|---|---|---|---|---|---|---|---|---|
| o | | | SECRET INFORMATION | | | | | | |
| a | V=0 | CM=1 | ACCESS COUNT | | | | | OVERFLOW | |
| b | " | " | DENOMINATING INFORMATION | | | | | | |
| c | " | " | OPERATION CODE 1 | | NUMBER OF METERS | | | METER-READING | CCE |
| d | " | " | B=1 | A=0 | RANGE P1 | B=0 | A=0 | RANGE P2 | |
| e | " | " | B=1 | RANGE P2 | | B=1 | RANGE P3 | | CCE |
| f | " | " | OPERATION CODE 2 | | CHECK | | DATE | | " |
| g | V=0 | CM=0 | TIME | | | CENTER NUMBER | | | " |
| h | " | " | INDEX | | | | CHECK | | |
| i | " | " | OPERATION CODE 3 | | INDEX VARIATION AT DATE 1 | | | | DAY |
| j | " | " | " | | INDEX VARIATION AT DATE 2 | | | | " |
| k | " | " | OPERATION CODE 4 | | DATE | | | | CCE |
| l | " | " | F=1 | METER 0 | F=1 | METER 1 | | | |
| m | " | " | F=0 | METER 2 (LOW BITS) | | METER 2 (HIGH BITS) | | | |
| n | " | " | F=1 | METER 3 | CCE | FILLING | | | |
| o | V=0 | CM=1 | OPERATION CODE 5 | | DATE | | | | CCE |
| p | " | " | RECEIPT N° | | CALCULATED INDEX | | | | CCE |

3P

CONTROL SYSTEM FOR FRANKING MACHINES

BACKGROUND OF THE INVENTION

The present invention relates to a control system for franking machines.

In conventional manner, franking machines are designed to enable major users to print stamps on postal items to be posted corresponding to the fees which the sender needs to pay to ensure that said postal items arrive at their destinations without any additional fees being due. Such franking machines totalize the franked values corresponding to the stamps printed and so franking machine use is very closely monitored, since the high throughout of which these machines are capable could lead to very large financial losses for the organization which collects the postage fees, in the event of the machines being used improperly.

Two parallel methods are used to do this, one being based on pre-payment of the values to be franked, and the other on post-payment. Conventionally, in the first case, franking machines cease to operate when the total of franked values reaches the pre-paid value, thereby requiring users to regularly "re-fill" their machines in order to prevent them from going out of service. In one known embodiment, transportable meters act as monitoring instruments and the user must remove these meters from the machines and convey them to the postal Administration for re-filling.

In the second case, the user provides regular detailed statements of the franking performed by each machine, and these statement must immediately be transmitted to the postal Administration under pain of inconvenient sanctions and on-site inspection of the meter units of the machines which inspections may be performed at any moment by employees of said postal Administration.

This method has the particular drawback of requiring both the user and the postal Administration to perform a considerable amount of bookkeeping and checking work in respect of the statements and, in practice, complicated and highly time-consuming procedures have to be used.

Both of the methods outlined above are thus capable of being improved to the advantage both of the postal Administration and of users by replacing difficult and inconvenient procedures requiring considerable human intervention, in particular for accounting and verification purposes, by procedures which are much simpler and which only require limited human intervention.

SUMMARY OF THE INVENTION

To this end, the present invention provides a system for controlling a set of franking machines which are placed under the surveillance of a control center for managing them and comprising to this end (and as does each of the franking machines) a logic circuit organized around at least one processor and memories.

According to a characteristic of the invention, the system comprises:

data transfer means of the portable card type for transmitting data back and forth between the control center and each of the franking machines by irreversibly writing data into the card memory under the surveillance of the processor of said card; and read/write means for communicating individually with any one of the data transfer means both in the control center and in each of the franking machines.

BRIEF DESCRIPTION OF THE DRAWINGS

The invention, its characteristics, and its advantages are described in greater detail below with reference to the listed figures.

FIG. 3 shows a portion of the memory contents of a "postage" card.

DETAILED DESCRIPTION OF THE INVENTION

Figure 1:
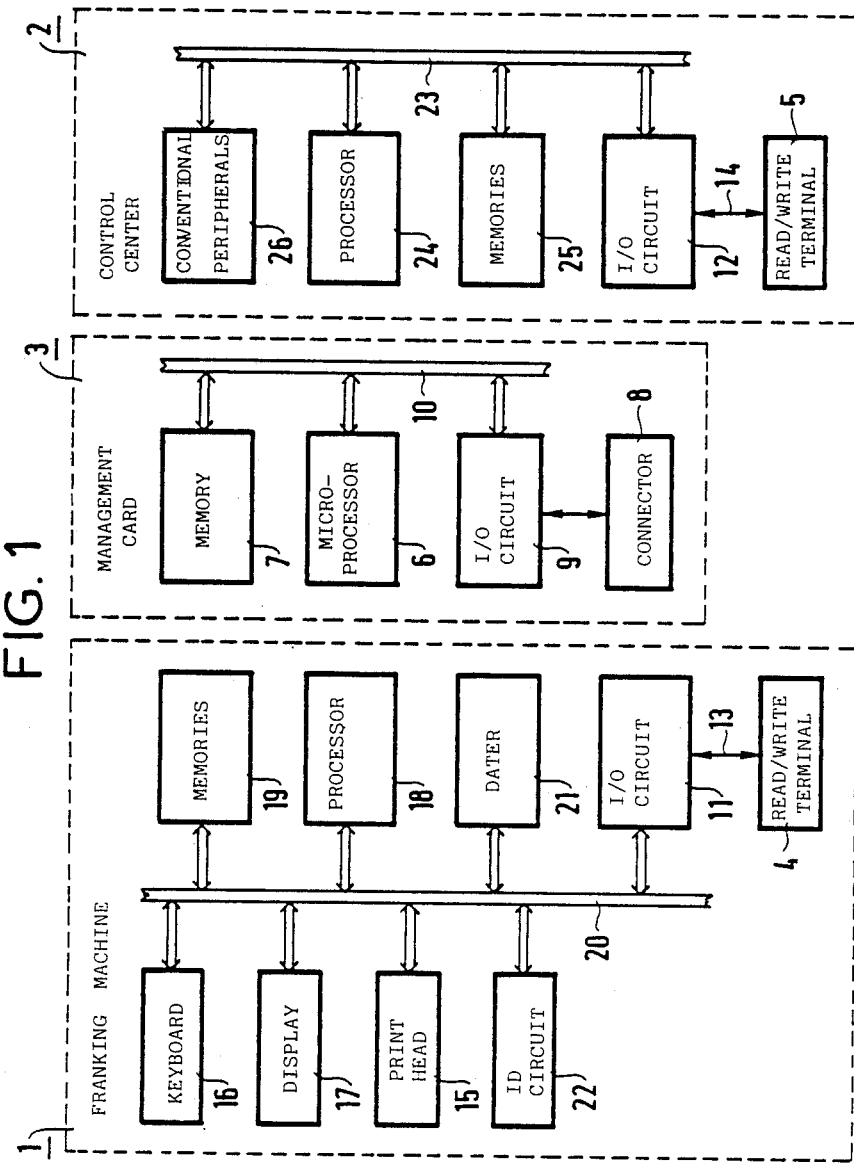
FIG. 1 is a block diagram of a control system in accordance with the invention.

The control system shown in FIG. 1 is intended to manage a set of franking machines 1, only one of which is shown in the diagram.

To this end, the control system comprises at least one control center from which regulations concerning operation of the machines are transmitted and via which operating information from the machines is received for processing.

The franking machines 1 and the, or each, control center 2 communicate their operating data or their regulations in digital form by means of "smart" cards 3 such as the card shown in FIG. 1, and the franking machines and control center(s), are respectively provided, for this purpose, with read/write terminals 4 or 5 into which the smart cards 3 are placed alternately.

In a preferred embodiment, each franking machine 1 only operates as a franking machine when a "postage" smart card 3P is actually present in its read/write terminal 4, with this card thus acting as an individual key specific to the machine.

The smart cards 3 are cards which include a microprocessor 6 and a memory 7 which is generally unerasable, contained in a container whose dimensions are the same as those of conventional payment or credit cards. In the example described, the smart cards 3 are CP8 type cards as defined, in particular, in the following documents: ISO/DP 7810 and ISO/TC97/SG17/WG4 N52 and N53, and only those characteristics which have a direct bearing on the invention are described below.

The same is true for the read/write terminals 4 and 5 which are known in themselves, and the terminals used may, for example, be TLP124 type terminals from the BULL corporation.

Each smart card 3 has an external connector 8 connected by an input/output circuit 9 to links 10 which interconnect the processor 6 and the memory 7 for interchanging binary data.

The connector 8 has tabs level with the surface of one of the large faces of the smart card 3 in which it is included, in order to provide a direct electrical connection between said tabs and corresponding contacts in a read/write terminal 4 or 5 in which the smart card has been appropriately inserted. Conventionally, the connector 8 has eight tabs for providing, in particular, an input/output serial link for binary data between the terminal and the card, together with clock signals and control signals which are received by the card and a power supply for the card.

Binary data is written into the memory 7 of the smart card 3 by electrical means in an unerasable form via the connector 8 and via the read/write terminals, with all read and write operations being monitored by the associated processor 6 which is suitable, by virtue of its program, to authorize or to prohibit such operations and which may, if necessary, render the card invalid.

Figure 2:
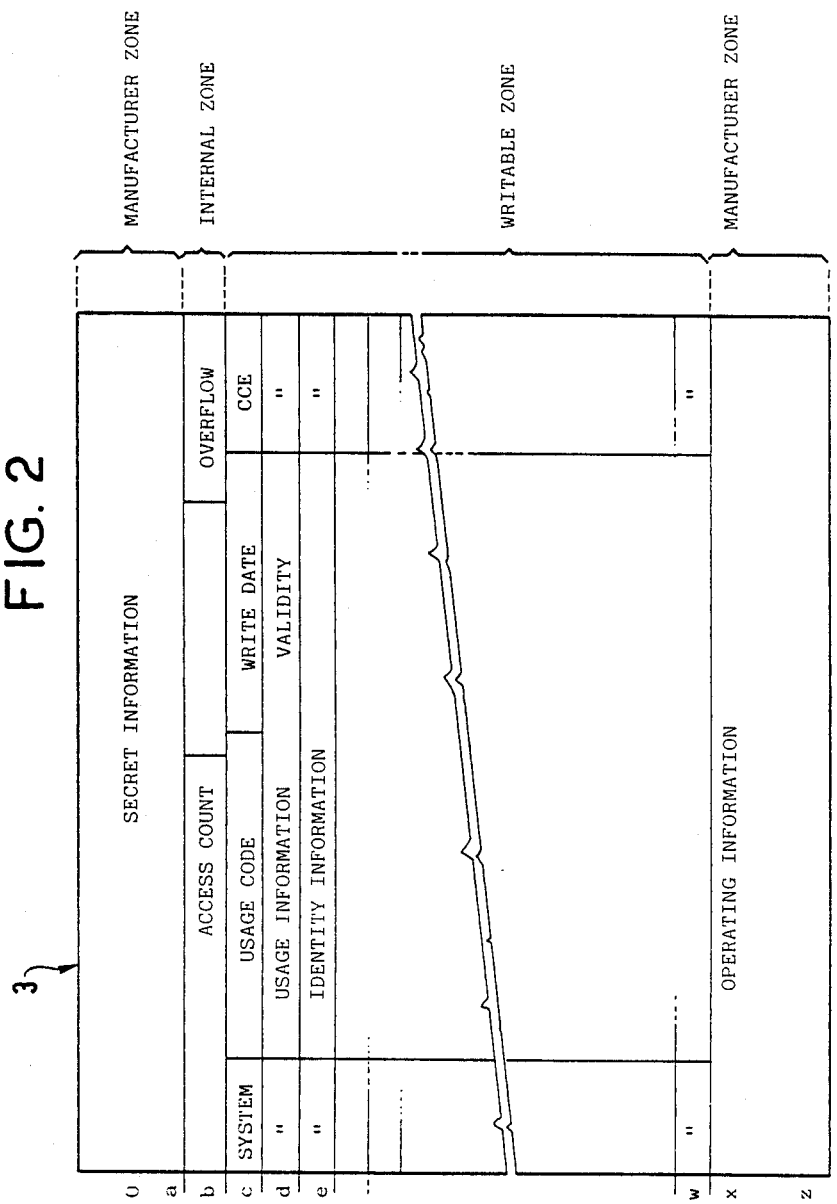
FIG. 2 shows a portion of the memory contents of a microprocessor and memory card.

In known manner, smart cards 3 of the above-mentioned type comprise a memory 7 which is divided into zones having different modes of access, as summarized in FIG. 2.

The memory 7 of a smart card 3 stores a given number of bits which are conventionally organized as a certain number of individually addressable words of equal length, with all the bits being initially set to the same value and being capable of changing their value once only.

A first memory zone comprising successive words addressed "O" to "a" in FIG. 2 is reserved, on manufacture, for receiving data intended to be used solely by the microprocessor 6, and the microprocessor prevents any read or write access to said zone after manufacture. The data contained in this zone may include, in particular, digital codes which constitute access keys, referred to as an issue key and as machine key for enabling the control center and a franking machine to exploit the card: the key-verification algorithm is also to be found in said zone.

A second zone of the memory 7 is referred to as an "access" zone and has the address "b" or distinctively totalizing successful and refused attempts at accessing the card memory via a read/write terminal 4 or 5. In particular, the processor 6 uses the data used in said access zone for invalidating the card either after a predetermined number of successive failed attempts, for example three successive failed attempts from a machine terminal 4, or else after the maximum number of permitted access attempts has been used up on the card, with data on this subject being conventionally transmitted to the user while the last authorized accesses are taking place.

A third zone of the memory 7, preferably situated at the end of the memory, is reserved for operating data which is written during manufacture and which is capable of being read by the read/write terminals 4 and 5.

In the "descriptive" data contained in this third zone of the memory 7 having addresses "x" to "z" in FIG. 2, there are included, in particular, the addresses of the first words of different memory zones, two indications defining procedures for accessing the "writable" zone as defined below, locking indications which may be used at different stages of writing data to the card, particularly at the end of manufacture, and identity numbers of the smart card concerned, of its manufacturer, and of the intended application, i.e. postal franking in this case. Conventionally, most of the descriptive data items are followed by error-correcting codes enabling their accuracy to be checked.

A fourth zone of the memory 7 constitutes a zone in which the read/write terminals 4 and 5 of the franking machines 1 and of the control centers 2 may write. This fourth zone has addresses "c" to "w" on FIG. 2 and chronologically receives binary data in the form of words at successive addresses alternately produced by a control center 2 to be read by a franking machine 1 under its control, and by said machine for reading by the center.

Each word defined by a specific address in the writable zone begins with a group of "system" bits, and the first or "locking" bit defines the status of the word, i.e. it indicates whether the word has been written in a non-modifiable manner on the card which includes the word or whether the word's location is available. A second "system" bit specifies the type of access key used for writing the word in which the bit is contained on a card, and its binary value indicates whether the read/write terminal which wrote the word used the issue access key, thereby implying that the writing was performed by the control center, or whether the terminal used the machine access key, which implies that writing was performed by the franking machine to which the card including the word is attributed.

This is naturally obtained by the microprocessor 6 in question comparing the access code as supplied by the read/write terminal where the access card 1 including the processor 6 is inserted with the issue and machine access key codes contained in the first zone of the memory 7 of said access card 1.

Other characteristics of words likely to be written in the writable memory zone are described in greater detail below when describing the control system per se, as shown in FIG. 1.

As mentioned above, the read/write terminals 4 and 5 of the franking machines 1 and the control centers 2 are intended to supply power to smart cards, and in particular to their processors, as well as interchanging information in the form of binary data solely by means of said cards. To this end, each read/write terminal 4 or 5 is connected to the electronic control or management logic circuit of the franking machine 1 or the control center 2 which it serves by means of an input/output circuit 11 or 12 via a two-way transmission link 13 or 14, which may be of the conventional V24 type, for example.

Each franking machine 1 is of conventional electronic type and comprises, in particular, a print head or unit 15 for stamping postal items on demand. This print unit 15 is completely conventional and writes, in particular, the data and place from which the postal item is posted together with the amount of postage franked thereon. Data enabling these indications to be written are conventionally inserted by means of a keyboard 16 available to the user. A display 17 is also includes in the franking machine and provides the user, for example on a screen, with a certain amount of useful information, in particular the results of user actions, selections which may be performed during a specific process, or the information stored in binary form in the readable portion of the memory 7 of the smart card 3 then inserted in the read/write device 4 of the franking machine 1 which includes the read/write device.

Other conventional devices, relating in particular to transferring, weighing and/or positioning postal items to be franked are not described herein given that although they are necessary to proper operation of the machine the do not have any direct bearing on the present invention.

However, it is necessary to mention that controlled franking machines in accordance with the invention each include an electronic control logic circuit organized around at least one processor 18. The processor ensures that the machine operates as a function of a program stored in its memories 19, of information provided by the control center via the smart card 3 placed in the machine's read/write terminal 4, and of indications provided by a user via the keyboard 16. The processor 18 also supervises information interchange with the smart card 3 placed in the read/write device 4 and provides, in particular, the clock signals which are necessary for operation of the microprocessor 6 on the card by means of an oscillator (not shown) associated with the processor 18.

Conventionally, the processor 18 is connected to its memories 19 and to the components 11, 15, 16, and 17 of the franking machine on which it is installed by means of a multiple bus 20 comprising at least a data bus, a control bus, and an address bus which are arranged according to requirements and are not shown specifically.

The memories 19 are conventionally divided into read only memories and read/write memories, and their storage is respectively permanent and temporary, with the memories storing the programs used by the machine and the data used or produced by said programs.

The read/write memory is conventionally backed-up in order to store data items which may change with time and whose loss would be damaging.

Data items which are backed up include data relating to the definition of various franking meters in the franking machine, which data items are provided by the control center 2 by the smart card 3 attributed to said franking machine and they are described in greater detail below. Also, under conditions mentioned below, data items corresponding to the contents of said franking meters are backed up between two successive payments.

In accordance with the invention, a dating equipment 21 is associated with each franking machine 1 in order to provide the calendar information required for dating regular meter readings which are stored firstly in a backed up zone of the memory 19 and also in the memory 7 of the smart card 1. This dating equipment 21 is of a conventional electronic type such as the MM 58274 model sold by National Semiconductor Corporation, and it is naturally supplied with a backed-up power supply ensuring that it operates without interruption, in particular when the franking machine 1 in which it is fitted is turned off.

In accordance with the invention, at least one identifying equipment is associated with each franking machine 1 for enabling the machine to supply identity data systematically and without user intervention to identify the machine to the smart card 3 inserted in its read/write device 4.

The identity equipment 22 and the dating equipment 21 are conventionally connected to the multiple bus 20 in order to provide the desired indications which they are capable of supplying at the request of the processor 18 in the form of binary coded data.

Conventional franking machines 1 are mechanically divided into two portions, one of which includes, in particular, the print unit 15, the keyboard 16, and the display 17, and forms a removable print head which is mounted on the other portion which forms a base and includes, in particular, devices for transferring and weighing as mentioned above, together with the power supply.

In such a case, some of the component parts are duplicated, for example, the memories 19, the processor 6, and the identity equipment 22, however this is not described in greater detail below since the general structure of such franking machines is not significantly different for control purposes from that described with reference to FIG. 1, except for certain minor points mentioned below.

In particular, in this kind of embodiment, each franking head possesses an individual identity number which it supplies to the processor of the base on which it is mounted every time it is turned on, and the base processor is also fitted with a specific identity equipment, for example of the programmed or hard-wired logic type. Any change of print head naturally requires the power to be switched off before the change for the purpose of separating the head and the base.

Similarly, the oscillator (not shown) of the processor included in the head supplies clock signals to the processor in the base which is a slave processor.

In contrast, backed-up read/write memory is preferably included in each head for retaining the data contained in the machine which is likely to change and whose loss would be damaging.

The control center shown diagrammatically in FIG. 1 comprises one or more read/write terminals 5 connected to a corresponding number of input/output circuits 12 each of which is intended, as mentioned above, to provide the adaptations required to the binary data for data interchange with the smart cards 3 via said terminal(s).

The input/output circuits 12 receive and transmit data interchanged with the write/read terminals via links of the V24 type, for example, as mentioned above. They act as an interface with respect to a data bus included in a multiple bus 23 which connects the I/O circuits 12 to the managing logic of the control center in which they are included.

This management logic is conventionally organized around at least one processor 24 associated with memories 25 and a conventional set of peripheral equipments for assisting management 26, including, if necessary, specialized processors, printers, display units . . . .

These various components of the control center are not described in greater detail since they are entirely conventional in control centers and are only indirectly related to the invention. The same goes for the programs necessary for running the center the franking machines, and the cards, given that these conventional programs add nothing in the present context to understanding the invention and stem from conventional techniques which have no direct bearing on the invention.

In accordance with the invention, the manufacturer of the smart cards 3 provides cards in the unrecorded state mentioned above, and operators in the control center add data content to the cards as a function of the franking machines 1 to which they are attributed and as a function of the intended use for them, so as to make the cards usable.

In order to do this, each smart card 3 is initially inserted into a read/write terminal 5 of the control center 2 in order to have additional personalizing information written into its writable zone, which information s not subsequently modifiable, as mentioned above.

In order to perform such writing, the control center provides the issue key code to the read/write device 5 in which the smart card 3 to be personalized has been inserted, thereby enabling the read/write device to transmit the issue key code to the processor 6 in the card. The processor then authorizes or refuses write access to the writable zone of the memory 7 in the card depending on whether or not it recognizes said issue key by comparing it with the key stored in address zones "O" to "a" of the memory 7.

The first write operation performed by the control center in a smart card 3 takes place at address "c" as shown in FIG. 2 and causes the system bits of the word at address "c" to be written, and in particular, it writes a locking bit V for preventing any subsequent modification of the word concerned after the present write operation, i.e. once the bit V has taken the value zero.

The second system bit CM (see FIG. 3) is a function of the writer, i.e. the franking machine or the control center, and this bit is not modified when the write operation is performed by the control center.

The first write operation also writes a usage indication in the form, for example, of a 7-bit word disposed after the system bits in memory address location "c". This indication specifies the preferably unique usage to which the smart card 3 containing it is intended. In a control system in accordance with the invention, this indication specifies, in particular, whether the smart card 3 is:

a 3P or "postage" type card specifically intended for interchanging information between a unique franking machine 1 and its control center 2;

a 3A supervisory card enabling control center personnel to perform checks on the machines;

a 3T maintenance card for technicians;

a 3C or "key" card which may be a master key or an auxiliary key and which allows a customer to split usage and franking costs between several different users of the same machine; and various other special use auxiliary cards, such as test cards or prepayment cards, etc.

The write operation in memory location address "c" also includes writing the write date in coded form after the usage indication and then an error correction code CCE enabling calculations to be performed after a read operation to verify whether the data written at location address "c" appears to be correct.

The first write operation by the control center 2 in the writable zone of the memory 7 of a smart card also includes writing in address "d" which immediately follows "c" in order to specify firstly additional information related to the usage defined by the usage indication present in address "c", and secondly a card validity item indicating, in particular, the date on which card validity begins and duration of said validity, followed by an error correction code. The word written in the location with address "d" also includes system bits as do all the words written in the writable zone.

By way of example, the information related to usage which is provided in location at address "d" in the writable zone of the memory 7 is:

information concerning the frequency at which the meters of the franking machine to which the card is attributed should be read, together with the possibility of locking up said machine in the event that certain conditions specified below are not satisfied, supposing that the card in question is a postage card;

information specifying the number of the control center person or the technician to which the card is attributed if the card is a supervisory card or a maintenance card; or information identifying the user or customer and indicating the account to which franking costs should be charged in the event that the card is an auxiliary key card or a master key card for use respectively as a replacement for the postage card in the events that a single machine is used by several users, and for allowing additional auxiliary cards to be created by the customer when the use of the single machine by several users is under the responsibility of said customer.

The first write operation by the control center 2 in the writable zone of the memory 7 of a smart card 3 also includes a series of data items which designate the card, and in particular an identity item followed by an error correcting code CCE in at least the word situated at location with address "e".

The identification data specifies, in particular, the identity number of the franking machine to which the smart card 3 is attributed, supposing the card is a key card or a postage card. It also specifies the number of the control center if the card is a postage card or a supervisory card, and the customer number if the card is a maintenance technician card.

On the first occasion that the control center writes designating information to the writable zone of the memory 7 of a postage card 3P, the operators at the control center also write in a certain number of indications which vary as a function of the intended use of the franking machine to which the postage card in question is specifically attributed.

As mentioned above, a first group of data items is contained in location at address "d" in the zone reserved for usage information, and this group specifies the frequency at which meter readings should be performed by a postage card 3P on the franking machine 1 to which it is attributed and on said postage card by its control center 2.

In the proposed embodiment, this usage information is specified in the form of two messages, the first of which is encoded on three bits and the other of which on two bits and these messages specify the frequency at which index meter readings should take place and the frequency at which postage meter readings should take place on the machine.

In conventional manner, the term "index meter reading" on a franking machine concerns reading a meter (preferably in backed-up read/write memory 19) containing the total number of postage items franked by the machine. In order to reduce the volume of data to be stored, only changes in the index meter from one reading to the next are communicated to a postage card 3P.

This may be used, for example, to enable one index meter reading per day, every other day, once a week, or at a fixed date in each month, during the period of card use, or each time an item is franked, or each time the power is switched on when performing tests.

The postage meter readings have the purpose of inducing the user of a postage card 3P to have the card regularly inspected by the control center which controls the franking machine 1 used by the user so as to enable the control center to read the data written on the postage card by the franking machine when in use, in particular for billing purposes.

Means are provided to enable the postage card 3P to lock up the franking machine if the meter reading frequencies are not adhered to. It is thus this "lock-up" frequency which is related, for example to the amount of franking performed by a machine that is specified by the control center in the postage meter-reading message mentioned above, and this frequency may be monthly or twice-monthly, for example.

It is also the control center which decides whether or not it is prudent for the franking machine to be locked up in the absence of a receipt message which should normally be written by the control center after reading a postage card 3P following a succession of meter readings performed by said postage card 3P on the machine to which it is attributed. This receipt locking up indication is written in location at address "d" as mentioned above in such a manner as to be taken into account by the processor 18 of the franking machine controlled by the postage card 3P, whenever a postage meter reading is not followed within the prescribed period by a receipt message written by the relevant control center 2.

During the first write operation by the control center 2 in the writable zone of the memory 7 in a postage card 3P, the operators also write a series of variable data items for personalizing the card and these items generally constitute a message which extends over several successive words.

In the example of the present embodiment, these data items seek to define the conditions under which statistical meter readings should be performed in order to obtain more information about the way in which customers use their franking machines 1.

In accordance with the invention, statistical meters are provided in a backed-up zone of the read/write portion of the memories 19 in each franking machine 1, and the number, capacity and reading frequency of these meters is defined by the personalization information written to the postage card 3P.

The message constituting the personalization data items for statistical meters conventionally begins with the system bits of a first word at address "f" (see FIG. 3), and these system bits are followed by an operation code which defines which type of operation the remainder of the message refers to.

In the chosen example, this operation code needs four bits and thus allows up to sixteen different types of operation to be designated. The following bits of the message are constituted, in this case, by an indication of the number of statistical meters to be provided in the memories 19, and this number is chosen by the operators at the control center 2 as a function, in particular, of the postal franking tariffs which are in force.

This indication of the number of meters is followed, in this case, by a "reading" indication defining the conditions under which the statistical meters are read, and these meter readings are performed substantially simultaneously in a machine.

In the proposed embodiment, this indication is constituted by a nine-bit word enabling the period to be specified in days, in weeks, or in months together with a specified day of the month.

The word at address "f" is conventionally terminated by an error correcting code and is followed by one or more words with successive addresses, each of which defines whether or not the selected ranges for the various possible meters is to be put into service.

In the embodiment proposed, the portions of the message relating to the various statistical meters follow one another without interruption, and two possible range capacities are provided for each meter, one of which extends over twelve bits and the other over twenty bits, and these may then require spreading out over two words at successive addresses. Each message portion attributed to a meter is preceded by two onebit indications, one of which is referenced A in FIG. 3 and specifies whether the following data corresponds to the definition of a meter range for an active statistical meter or to a zone which is not authorized for franking, and the other bit referenced B indicates whether the following data corresponds to a twelve-bit range, which occupies the same word, or a range which extends beyond the word, with the more significant bits then being situated in the other portion.

In one embodiment, a first franking statistical meter of value zero is always provided, in particular for correcting franking date errors, together with a last statistical counter whose range extends from the maximum allowable value and the sum of the ranges covered together by the other counters, neither of which is included in this case in the message constituting the personalization information for statistical counters. This message is terminated by an error correcting code which in this case covers all of the data from the previous error code recorded on the card.

From this moment, the postage card 3P as filled in this way is ready to be taken out from the read/write device 5 in the control center 2 for inserting into the read/write device of the franking machine 1 to which it is attributed.

When a franking machine is put into service, it is usual for it to be verified by a supervisory person who controls the machine by means of a specialized smart card 3 for putting the machine into an initial state. The postage card 3P filled in in the manner described above is inserted instead of the supervisory card for a first exchange of data during which the machine receives the data written into the postage card 3P by the control center 2 for the specific franking machine, together with its identification number, in particular. In return, the machine provides the postage card 3P with information taken from the supervisory card and receives the data written for itself in the postage card 3P by the control center 2.

The processor 18 of the machine compares the machine identification number which it receives from the card with the number contained in the machine itself so as to allow operations to continue if the numbers are identical or so as to lock the machine up, as indicated above. In parallel, the processor 18 is suitable for temporarily recording the denominating information from the card in the read/write portion of its memories 19 so as to allow only those operations which are authorized for the type of card which is inserted in is read/write terminal.

After transferring and taking account of the data written by the control center 2 on the postage card 3P for the processor 18 of the franking machine 1 concerned, the processor writes a message into the writable zone of the memory 7 of the card immediately after the last word written therein, which message is composed of an operating code, a machine identity number, the date supplied by the dater equipment 21 which has been set to the proper time and day by the supervisory person, the zero contents of the index meter 27, and a check message (words at addresses i, j, k, see FIG. 3).

When a word is written by the franking machine, the system bits are different, the locking bit V takes the value zero preventing any subsequent writing to the word at this address, and the second system bit CM takes the value zero if the key transmitted by the franking machine to the postage card corresponds to the machine key stored in said card by the control center. This bit CM referred to as the machine key, is not changed, unlike the locking bit, when writing by means of the issue key, i.e. when the control center is writing.

Each time the franking machine 1 is switched on, it reads the data contained in the postage card 3P which is attributed thereto and which acts as a key which is essential for its own operation. The data supplied by the postage card 3P is verified by the processor 18 by comparison and/or analysis depending on the type of data in question. So long as no anomaly is detected during this verificatin stage, the franking process may be put into operation so long as the postage card is present. The various index meter readings specified by the card 3P take place systematically.

The control center 1 may optionally cancel all or a portion of the data in the card memory, as provided in this case in words addressed f to k in FIG. 3, during a postage meter reading operation when the postage card 3P is inserted into a read/write terminal 5. It may also substitute new data following the last word previously written.

Each time an index meter is read, the franking machine 1 calculates the difference between the present value and the value stored last time it was read as stored in its memory, and the result is transmitted to the postage card 3P which controls the machine.

Each time the statistical meters are read, the processor 18 of the franking machine 1 transmits a message to the controlling postage card 3P, which message conventionally comprises a single word (having the address n) with system bits V and CM, the operation code characteristic of statistical meter reading, the full date, and an error correcting code, together with a succession of data items which conventionally run over several words, giving addresses o to q in this case, each of which comprises an indication F concerning extent, together with the amounts displayed by the relevant meter. The indication F specifies whether the amount requires more or less than, for example, thirteen bits to be written, and thus whether it needs to be spread over two half-words, one of which is thirteen bits long and the other of which is eleven bits long, for example.

The last amount to be recorded is followed by an error correcting code which follows all of the binary data recorded since the previous error correcting code, i.e. the error correcting code in the word at address n in the present case.

After a succession of index meter and statistical meter readings, the postage card 3P must be returned to the control center 2 at the date specified and recorded in its memory 7 in order to transmit the data which it has collected and to receive a receipt message from the control center showing that this transmission has indeed taken place.

To this end, the postage card 3P is removed from the franking machine in order to be inserted in the read/write terminal 5 of the control center 2.

The processor 24 in the center then reads the data contained in the memory center of the card in conventional manner after obtaining authorization from its microprocessor 6 to which it has previously transmitted its own issue code for this purpose.

After reading the card, the processor 24 writes a receipt message after the last message from the franking machine 1.

This receipt message begins with system bits V and CM, with the first bit being set to zero after writing and the other bit to one, followed by a receipt operation code and an indication of the date, which together constitute a single word addressed r in this case, which is terminated by an error correcting code.

The receipt message is followed by the order number of the receipt which is established on the basis of the previous order number for the machine as indicated on the postage card and as also stored by the control center for verification purposes. This order number is followed by index data item calculated in absolute terms by the control center 2 on the basis of the information it has received, and this absolute value index extends over at least one word using a process analogous to that described above for the various data items requiring a large number of bits.

After writing a receipt message in the postage card 3P, the card is returned by the read/write terminal 5 of the control center where it has been processed and it must then be reinserted into the franking machine which it controls.

As already mentioned above, it is possible to add special management information each time postage cards 3P pass through the control center 2 in order to modify regulations previously issued and in order to add new regulations, and the present description does not pretend to cover all possible variations on the subject.

On returning the postage card 3P into the franking machine which it controls, and after the control center 2 has written a receipt thereto, the processor 18 of the franking machine takes account of the data written by said center in the card and, in particular, it compares the absolute value index as calculated by the center with the absolute value index as calculated by itself. If there is a disagreement, the processor 18 writes a message both into its own memories 19 and into the card memory 7, which message comprises firstly the system bits V=0, CM=0, followed by an operation code characteristic of such disagreement, and then data comprising the absolute value index as calculated by itself, which data extends over at last one word and is followed by an error correcting code.

After this message has been written, the operations of writing to the memory 7 of the postage card continue as before.

When nearly all of the memory 7 had been written 2, this is indicated to the user by means of the franking machine display 17 which receives corresponding data from the processor 18 after being properly informed by the processor in the postage card.

The postage card 3P must then be replaced since the franking machine will lock up in the next few days when the memory 7 is completely used up.

The user replaces a used postage card 3P by inserting a new postage card in the read/write device 4 of the franking machine. The new postage card is obtained by the control center 2 and includes denomination data and meter definition data as supplied to it by the center. After the card has recognized the franking machine and has been recognized by the machine that expected a new card, the processor 18 in the franking machine sends a succession of data items to the processor 7 in the new card which items have been read from the previous card and stored in the backed up zone of the memories 19.

This succession of data items comprises a dated control message containing a operation code for changing a postage card, together with the time the change takes place corresponding to the new card being put into operation, and at least the code of the control center. It also includes all of the data items which were written in the previous card starting from the last receipt message and up to the end of the card. After writing this data into the memory 7 of the new postage card and optionally after reading it back again to the franking machine 1 with the data being displayed on the freaking machine display 17, the franking machine is ready to continue with normal operation.

It is not necessary to return used postage cards to the control center, since the new card includes all the indications necessary for inputting operating data to the control center and since putting the new postage card into operation serves to invalidate the previous card.

If a postage card 3P is lost or damaged, the franking machine to which it is attributed locks up and a new postage card must be made under the control of a technician provided with a special maintenance card 3T.

The maintenance card 3T is inserted into the read/write terminal 4 of the franking machine 1 concerned, and data relating to the lost card is keyed in via the keyboard 16 of the machine in order to enable a new postage card 3P to be authorized. The new postage card 3P is then inserted into the read/write terminal 4 instead of the maintenance card 3T in order to receive the data saved in the memories 19 of the franking machine. This data corresponds, in practice, to the data supplied to a card when being renewed, together with a message indicative of a maintenance operation and a message indicative of a lost card.

What is claimed is:

1. A system for managing a set of franking machines from a control center, each of said franking machines and said control center having a logic circuit including at least a processor and memory, said system comprising:
   read/write means connected to the logic circuits in each of said franking machines and said control center; and
   at least one smart card, including an internal processor and memory, for transmitting data back and forth between said control center and at least one of said franking machines by successive writings to and readings from the memory of said smart card under control of the internal processor of said smart card, said writings being irreversible.

2. A system according to claim 1, wherein said logic circuit at said control center includes means for writing to said at least one smart card an access code corresponding to a particular one of said franking machines, which access code must be sent to said smart card from said franking machine for checking by the internal processor of said smart card before writing to said smart card memory by said franking machine will be permitted.

3. A control system according to claim 1, characterized in that it includes downloading means at said control center for providing to said smart card data concerning meter reading frequency and the definition of the number of meters and the ranges they cover in a franking machine, said data being written as binary data in the memory of a "postage" card attributed to said machine, prior to said card being put into operation in said machine to which it is attributed in order to ensure said data is applied as soon as said card is put into operation.

4. A control system according to claim 3, characterized in that the meter-defining data written into the memory of a postage card attributed to a franking machine defines the number and the ranges of "statistical" meters which cover the franking range of said machine.

5. A control system according to claim 1, characterized in that the card attributed to each machine includes surveillance means which act on means for locking up said machine and which are suitable for detecting and indicating the absence of receipt messages periodically written by the control center into the memory of the postage card after meter readings of the franking machine have been chronologically written into said smart card memory by said machine.

6. A control system according to claim 1, characterized in that the postage card attributed to each franking machine comprises means for detecting approaching exhaustion of the remaining writable zone of the card memory in order to cause the franking machine to make a corresponding signal and to authorize the transfer into the memory of the processor of the franking machine to which it is attributed of the data contained in its own card memory as from the last receipt message in order to enable said data to be subsequently transferred into a new authorization card by the read/write means of said franking machine when said new authorization card is put into service.

7. A control system according to claim 1, characterized in that it includes auxiliary smart cards which are provided with special usage indications giving access to at least a plurality of franking machines for executing special operations by those of said machines whose read/write means have one of said transfer means connected thereto.

8. A control system according to claim 1, characterized in that each franking machine includes lock-up means sensitive to the presence of an appropriate smart card in its read/write means for preventing operation of said machine in the absence of such a card.

9. A control system according to claim 1, characterized in that each franking machine includes dating means having a continuously operating clock running from a backed-up power supply for supplying the machine and transfer means connected to its read/write means with calendar data required for dating the data.

* * * * *